United States Patent
Ohno et al.

(10) Patent No.: US 10,730,452 B2
(45) Date of Patent: Aug. 4, 2020

(54) AUTOMOBILE INTERIOR COMPONENT

(71) Applicant: KASAI KOGYO CO., LTD., Kanagawa (JP)

(72) Inventors: Tatsushi Ohno, Kanagawa (JP); Nobuaki Seki, Kanagawa (JP); Akihito Suzuki, Kanagawa (JP)

(73) Assignee: KASAI KOGYO CO., LTD., Kanagawa (JP)

( * ) Notice: Subject to any disclaimer, the term of this patent is extended or adjusted under 35 U.S.C. 154(b) by 59 days.

(21) Appl. No.: 16/308,388

(22) PCT Filed: Oct. 24, 2016

(86) PCT No.: PCT/JP2016/081398
§ 371 (c)(1),
(2) Date: Dec. 7, 2018

(87) PCT Pub. No.: WO2018/078682
PCT Pub. Date: May 3, 2018

(65) Prior Publication Data
US 2020/0001801 A1 Jan. 2, 2020

(51) Int. Cl.
*B60R 13/02* (2006.01)
*B60J 5/04* (2006.01)

(52) U.S. Cl.
CPC ............ *B60R 13/02* (2013.01); *B60J 5/0493* (2013.01); *Y10T 428/2419* (2015.01); *Y10T 428/24174* (2015.01); *Y10T 428/24802* (2015.01)

(58) Field of Classification Search
CPC ....... Y10T 428/2419; Y10T 428/24174; Y10T 428/24802; B60R 13/02; B60R 13/0237; B60R 13/0243
See application file for complete search history.

(56) References Cited

U.S. PATENT DOCUMENTS

| 2,274,765 A * | 3/1942 | Zalkind ................ A47B 96/201 |
| | | 428/133 |
| 2009/0110879 A1* | 4/2009 | Lewis .................... B26D 3/065 |
| | | 428/137 |

FOREIGN PATENT DOCUMENTS

| JP | H02-63219 U | 5/1990 |
| JP | H04-144715 A | 5/1992 |
| JP | 2008-87206 A | 4/2008 |
| JP | 2011-46311 A | 3/2011 |

OTHER PUBLICATIONS

International Search Report for International Application No. PCT/JP2016/081398 dated Nov. 22, 2016, Japan.

* cited by examiner

*Primary Examiner* — Alexander S Thomas
(74) *Attorney, Agent, or Firm* — United IP Counselors, LLC

(57) ABSTRACT

An automobile interior part includes a base, which has a surface and a back surface, and also includes a skin, which has a back surface integrally laminated on the surface of the base. The automobile interior part has a main body and a flange that is continued to the main body. The skin has a fold part that is formed between the main body and the flange. The base has a body base that constitutes the main body and also has a flange base that constitutes the flange and that is separated from the body base at the fold part. The back surface of the skin between the body base and the flange base is exposed along the fold part. The automobile interior part has a good appearance.

4 Claims, 14 Drawing Sheets

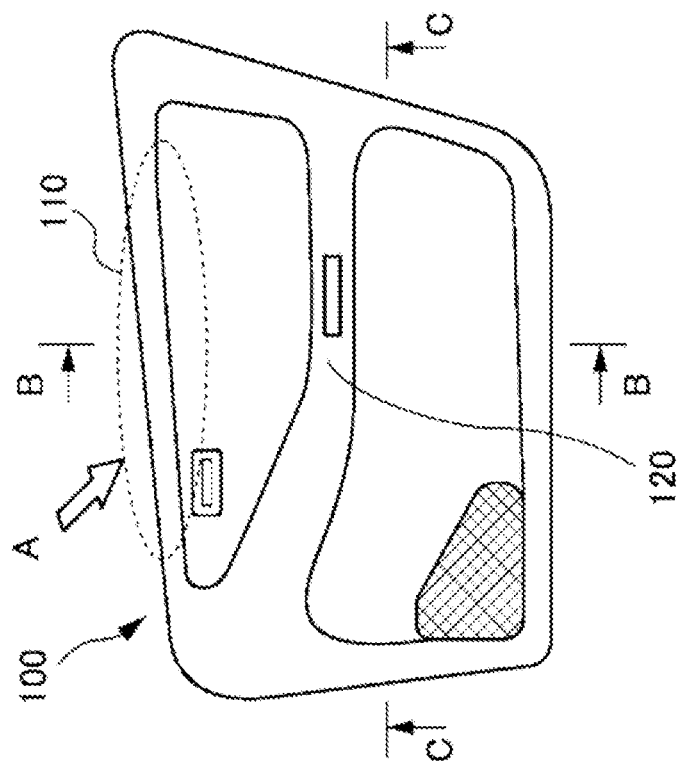
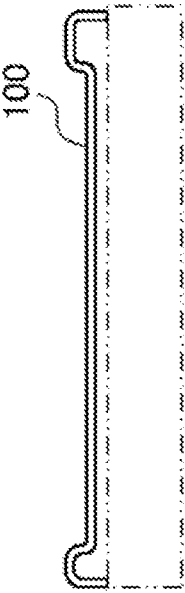
FIG. 1A
FIG. 1D
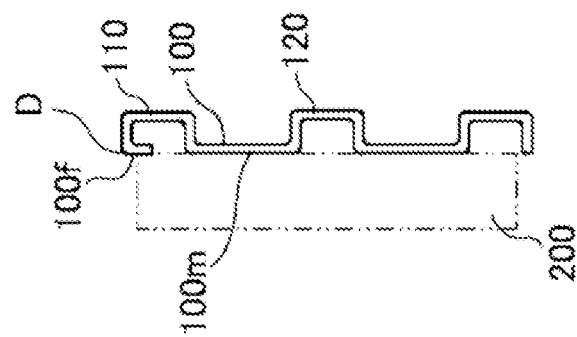
FIG. 1C
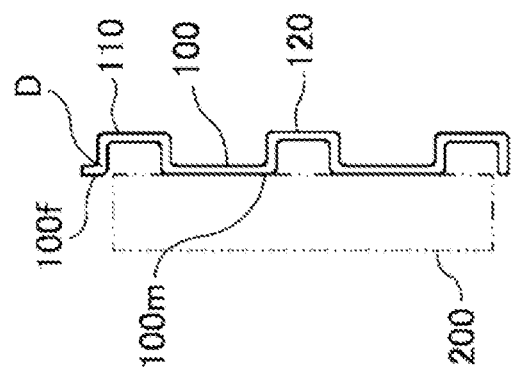
FIG. 1B

AUTOMOBILE INTERIOR COMPONENT

CROSS-REFERENCE TO RELATED APPLICATIONS

This application is a National Stage Entry application of PCT International Application No. PCT/JP2016/081398, filed on Oct. 24, 2016, the entire contents of which are hereby incorporated by reference.

BACKGROUND

1. Technical Field

The present invention relates to an automobile interior part.

2. Description of the Background

Typically, a door trim for a vehicle includes a core material and a resin skin material that is integrally laminated on a surface of the core material. The core material includes a vertical piece that is bent from an edge of a door waist of the door trim. The skin material has an end that is folded and is adhered at an end of the vertical piece. The door trim for the vehicle is an example of an automobile interior part. An existing door trim may be manufactured by folding a vertical piece at a thin hinge part toward a waist part after an edge of the waist part and the vertical piece are integrally molded via the thin hinge part in a horizontal manner so that they are foldable. Such a door trim is disclosed in Japanese Unexamined Utility Model Application Publication No. H2-63219 (hereinafter referred to as "Patent literature 1").

However, the thus manufactured door trim may have a resin skin material with a whitened surface due to folding of the vertical piece at the thin hinge part toward the waist part. Thus, the door trim should be improved to have a good appearance at a part that is frequently seen by a user, such as a door waist.

BRIEF SUMMARY

The present invention has been achieved in view of the above-described problem, and an object of the present invention is to provide an automobile interior part with a good appearance.

To achieve the above object, the present invention is embodied in the following structure.

An aspect of the present invention provides:
(1) An automobile interior part, including:
 a base having a surface and a back surface;
 a skin having a back surface integrally laminated on the surface of the base;
 a main body; and
 a flange that is continued to the main body;
 wherein the skin has a fold part formed between the main body and the flange,
 the base has a body base that constitutes the main body, and a flange base that constitutes the flange and that is separated from the body base at the fold part, and
 the skin has a back surface that is exposed along the fold part between the body base and the flange base.
(2) In the structure in (1),
 the body base and the flange base respectively have side surfaces that face each other, and the side surfaces are separated from each other in a condition in which the fold part is bent from the back surface side toward the surface side of the skin.
(3) In the structure in (1),
 the side surfaces of the body base and the flange base, which face each other, partially contact with each other in a condition in which the fold part is folded from the surface side toward the back surface side of the skin.
(4) In the structure in any one of (1) to (3),
 the main body having the fold part is bent in a direction crossing a direction of folding the fold part,
 the flange base constituting the flange is divided into multiple flange base pieces at a dividing position that extends from the fold part to an edge of the flange, and
 the back surface of the skin is exposed along the dividing position between the flange base pieces that are adjacent to each other.
(5) In the structure in any one of (1) to (4), the surface of the skin constituting the flange has a pattern.

The present invention provides an automobile interior part with a good appearance.

BRIEF DESCRIPTION OF DRAWINGS

FIG. 1A is a front view of a door trim as viewed from a vehicle compartment side, FIG. 1B is an end view of the door trim at a part indicated by an arrow B before a flange is folded, as viewed from a front side, FIG. 1C is an end view of the door trim at the part indicated by the arrow B after the flange is folded, as viewed from the front side, and FIG. 1D is an end view of the door trim at a part indicated by an arrow C as viewed from a lower side.

DETAILED DESCRIPTION

First Embodiment

The following describes details of a first embodiment for implementing the present invention (hereinafter, referred as "first embodiment") with reference to the drawings. Unless otherwise noted, a vehicle exterior side, a vehicle compartment side, a front side, a rear side, a left side, a right side, an upper side, and a lower side are directions respectively centered at a vehicle. In addition, the front-rear direction, the left-right direction, and the upper-lower direction, which are centered at the vehicle, may be referred as an x-direction, a y-direction, and a z-direction, respectively.

Although the embodiments described below use a door trim 100 as an example of an automobile interior part, the automobile interior part is not limited thereto. The present invention can also be used for an automobile interior part such as a rear parcel shelf, a floor trim, a luggage trim, a trunk trim, a rear side trim, a pillar garnish, or a roof trim.

Figure 2:
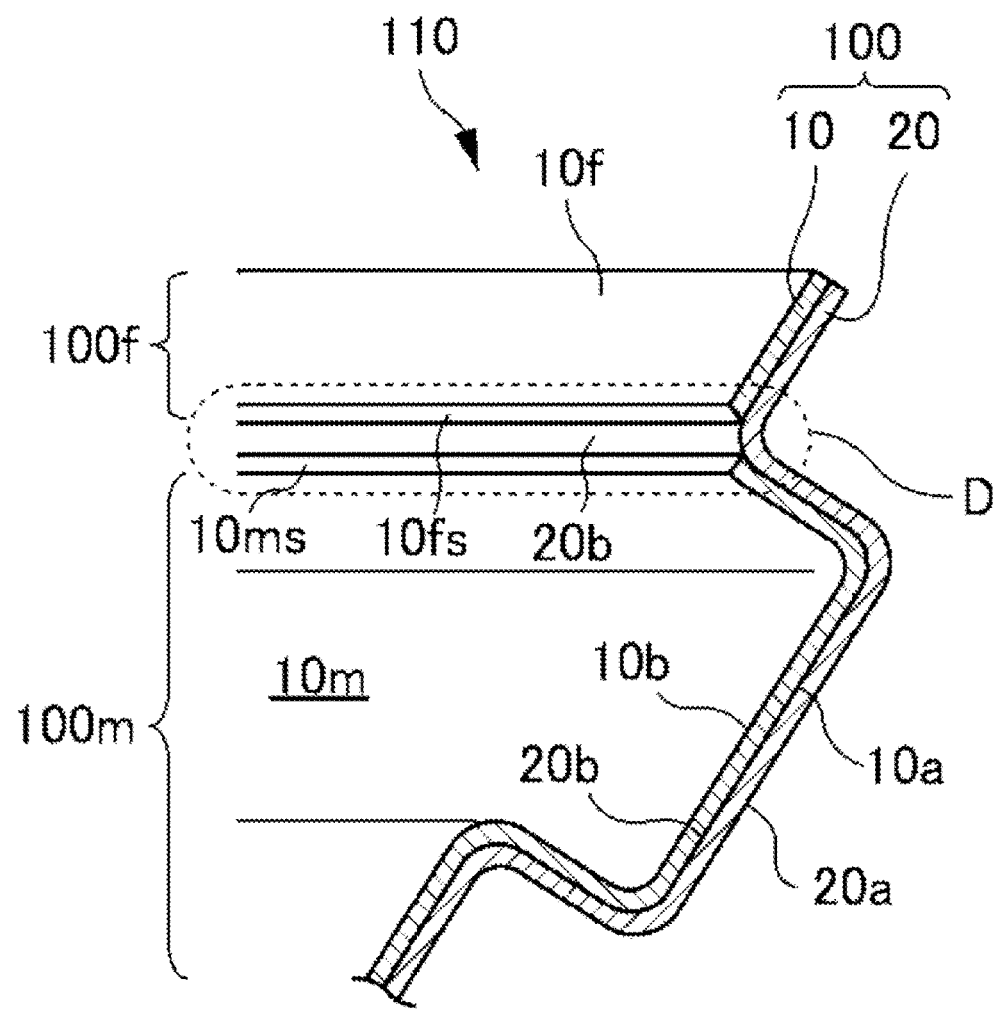
FIG. 2 is a view before the flange is folded, as viewed from the direction of an arrow A in FIG. 1A.
Figure 3:
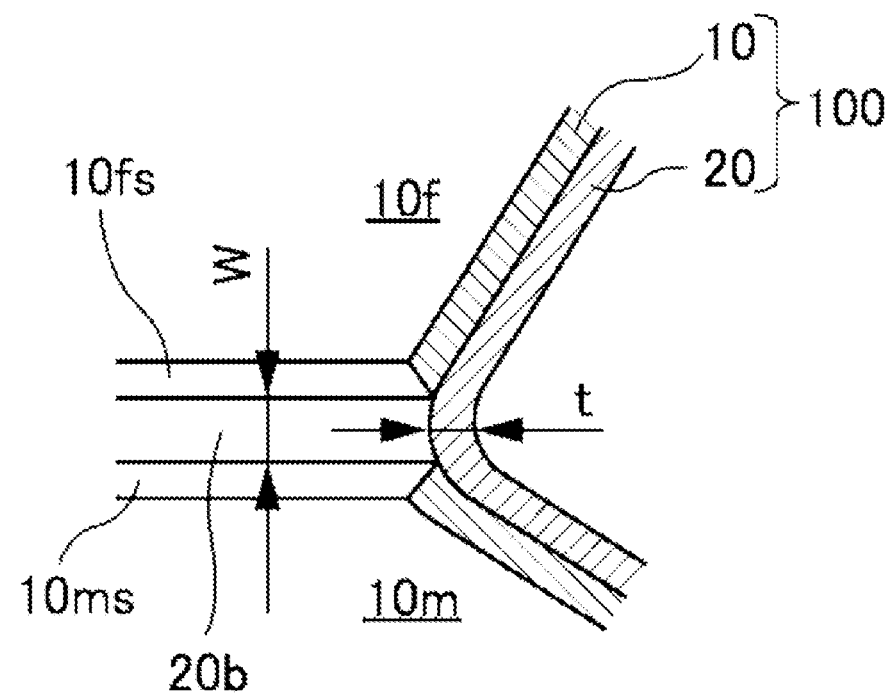
FIG. 3 is a detailed view of a fold part D in FIG. 2.

FIGS. 1A to 1D are explanatory diagrams of a door trim 100 to be arranged to a door on the right side of a vehicle. FIG. 2 is a view of a waist part 110 of the door trim 100 before a flange 100f is folded, as viewed from the vehicle exterior side toward the vehicle compartment side in the direction of an arrow A in FIG. 1A. FIG. 3 is a detailed view of a fold part D in FIG. 2.

FIG. 1A shows the structure of the door trim 100. The door trim 100, which is an automobile interior part, is to be mounted to cover a vehicle compartment side of a door panel 200 that constitutes a door. The door trim 100 has an upper part at which a waist part 110 is horizontally disposed and expands toward the vehicle compartment side. The door trim 100 has a lower part, a front part, and a rear part, which are bent toward the door panel 200 in the vehicle exterior side. The door trim 100 has a center part having an armrest 120 that expands toward the vehicle compartment side.

The door trim 100 has a main body 100m and a flange 100f that is continued to the main body 100m. Before the door trim 100 is assembled to the door panel 200, that is, before the flange 100f is folded, the flange 100f upwardly extends from the main body 100m at an illustrated fold part D, as shown in FIG. 1B. At the time of assembling the door trim 100 to the door panel 200, the flange 100f is folded so as to downwardly extend from the main body 100m at the illustrated fold part D, as shown in FIG. 1C.

The door trim 100 includes a base 10 and a skin 20. The base 10 has a surface 10a and a back surface 10b. The skin 20 has a back surface 20b that is integrally laminated on the surface 10a of the base 10.

The base 10 is to be fitted to the door panel 200 and has a desired stiffness necessary for maintain the shape.

The thickness of the base 10 is preferably in a range of 3.0 to 6.0 mm from a point of view of obtaining a desired stiffness, light weight, processability, and other characteristics.

The base 10 uses a thermoplastic resin. An example of the thermoplastic resin includes a polyethylene resin, a polypropylene resin, a polystyrene resin, a polyethylene terephthalate resin, a polyvinyl alcohol resin, a polyvinyl chloride resin, a polyamide resin, a polyacetal resin, a polycarbonate resin, an ionomer resin, and an ABS resin. The thermoplastic resin is mixed with a filler such as reinforcing fiber or reinforcing particles, as necessary, and is also mixed with an additive such as a colorant or a frame retardant, as necessary.

The base 10 is formed by injection molding so as to be a resin solid or a foamed molded article.

The skin 20 uses a resin such as an olefin elastomer (TPO), a thermoplastic polyurethane (TPU), or a polyvinyl chloride (PVC).

The skin 20 may be a laminated material having two or more layers including an upper layer and a lower layer. The skin 20 may be a laminated material having an upper layer that is made of a thermoplastic resin sheet and having a lower layer that is made of a foamed resin, such as polyurethane foam, polyethylene foam, or polypropylene foam, to which a filler is added as necessary. Alternatively, the skin 20 may be a single layer material instead of the laminated material.

The thickness of the skin 20 is selected from a range of approximately 0.2 to 2 mm in accordance with the number of laminated layers, a necessary strength, and necessary functions.

The skin 20 constitutes the main body 100m and the flange 100f and has a surface 20a that is provided with a decorative part, such as a pattern.

Thus, compared with a door trim having a decorative part, such as a pattern, only at the main body 100m, a pattern change between the main body 100m and the flange 100f is reduced, whereby the fold part D between the main body 100m and the flange 100f is unlikely to attract attention, and the door trim 100 has a good appearance.

The structure of the door trim 100 before the flange 100f is folded is described in detail below.

FIG. 2 shows details of the structure of the door trim 100. The skin 20 has the fold part D that is formed between the main body 100m and the flange 100f. The base 10 has a body base 10m, which constitutes the main body 100m, and a flange base 10f, which constitutes the flange 100f and is separated from the body base 10m at the fold part D. The back surface 20b of the skin 20 that is positioned between the body base 10m and the flange base 10f is exposed along the fold part D. Note that the exposed state represents a state in which the base 10 is not laminated on the back surface 20b of the skin 20 in a direct contact manner, whether or not the back surface 20b is visually viewed.

The body base 10m and the flange base 10f have side surfaces that face each other, which are a body-base side surface 10ms and a flange-base side surface 10fs, respectively. Before the door trim 100 is assembled to the door panel 200, the body-base side surface 10ms and the flange-base side surface 10fs are separated from each other in the condition in which the fold part D is bent from the back surface 20b side toward the surface 20a side of the skin 20.

Figure 4:
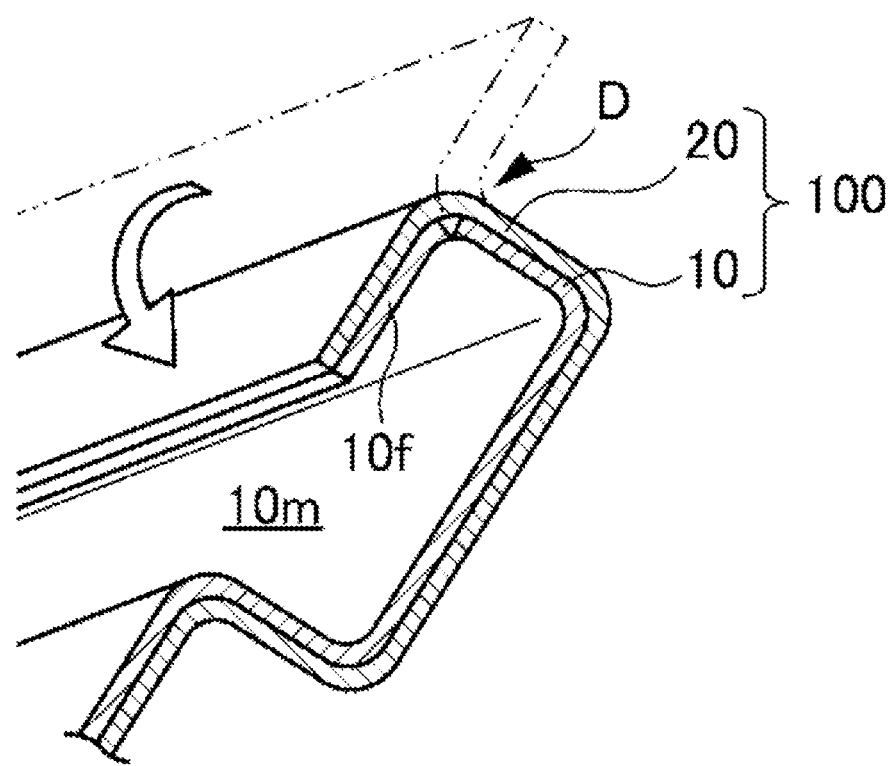
FIG. 4 is a view after the flange is folded, as viewed from the direction of the arrow A in FIG. 1A.
Figure 5:
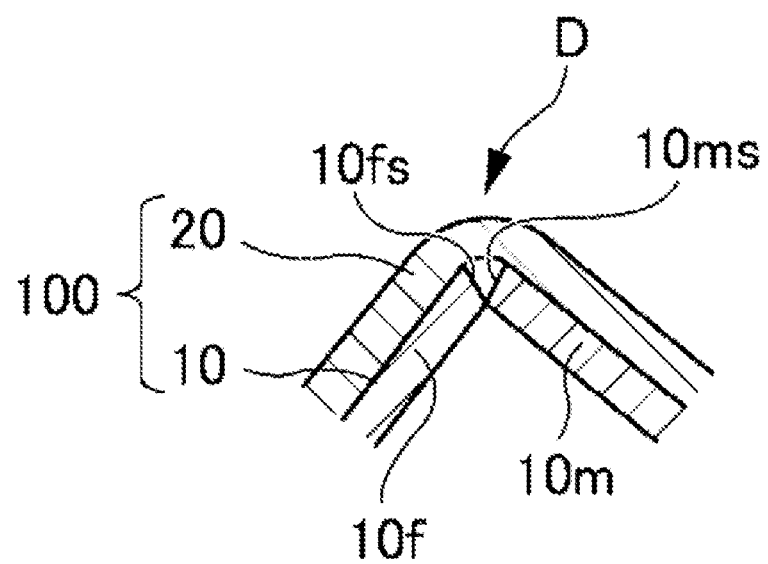
FIG. 5 is a detailed view of the fold part D in FIG. 4.

FIG. 4 is a perspective view as viewed from the direction of the arrow A in FIG. 1A and shows the waist part 110 of the door trim 100 after the flange 100f is folded, as viewed from the vehicle exterior side toward the vehicle compartment side. FIG. 5 is a detailed view of the fold part D in FIG. 4.

The structure of the door trim 100 after the flange 100f is folded is described in detail below.

As shown in FIG. 4, in assembling the door trim 100 to the door panel 200, the flange 100f is folded in a direction indicated by an illustrated arrow. Then, as shown in FIG. 5, the flange 100f is folded until the side surface of the body base 10m and the side surface of the flange base 10f, that is, the body-base side surface 10ms and the flange-base side surface 10fs, partially contact with each other, and the flange 100f is prevented from being further folded.

As described above, before the door trim 100 is assembled to the door panel 200, the facing side surfaces of the body base 10m and the flange base 10f, that is, the body-base side surface 10ms and the flange-base side surface 10fs, are separated from each other in a bent manner from the back surface 20b side toward the surface 20a side of the skin 20. That is, the body-base side surface 10ms and the flange-base side surface 10fs do not have the base 10, which has a high modulus of elasticity relative to the skin 20, therebetween, and the fold part D has only the skin 20 and thereby has a thin thickness t (refer to FIG. 3). Thus, in assembling the door trim 100 to the door panel 200, although the flange 100f is folded, stress of the surface 20a of the skin 20 is decreased. This enables the surface 20a of the skin 20 at the fold part D to be less prone to cause whitening and to have a good appearance. The whitening is a phenomenon in which tiny cracks are generated due to causes such as a load, thereby causing a whitish appearance.

Moreover, the flange 100f is folded until the body-base side surface 10ms and the flange-base side surface 10fs partially contact with each other, and the flange 100f is prevented from being further folded. This facilitates determining the shape of the door trim 100 in assembling the door trim 100 to the door panel 200.

Second Embodiment

The following describes details of a second embodiment for implementing the present invention (hereinafter, referred as "second embodiment") with reference to the drawings.

Figure 6:
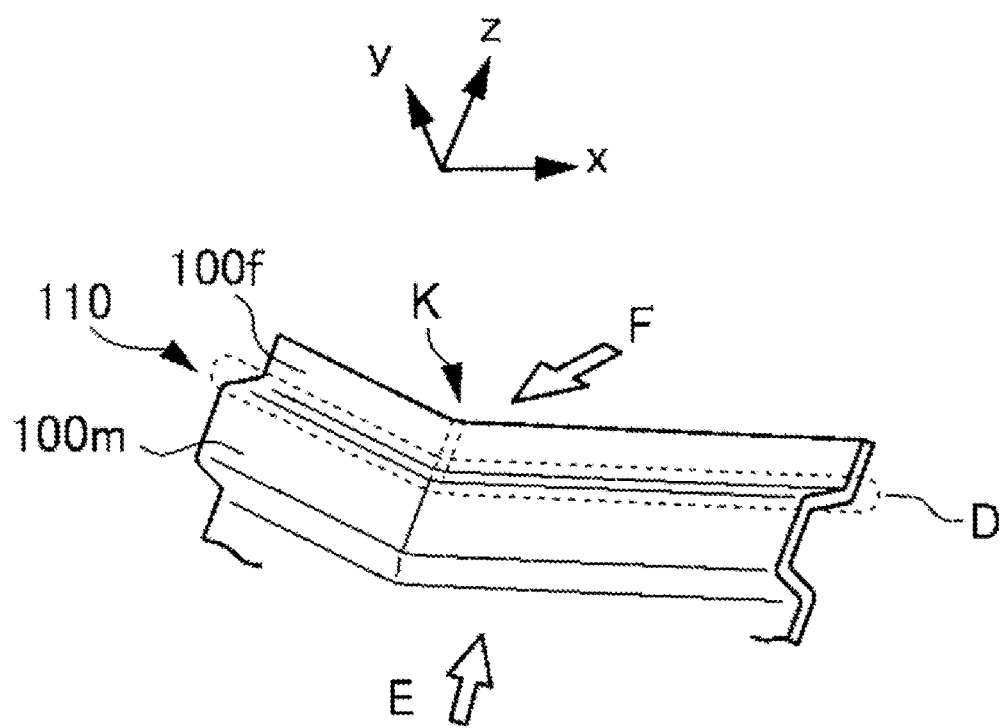
FIG. 6 is a perspective view of a waist part before a flange is folded according to a second embodiment.
Figure 7:
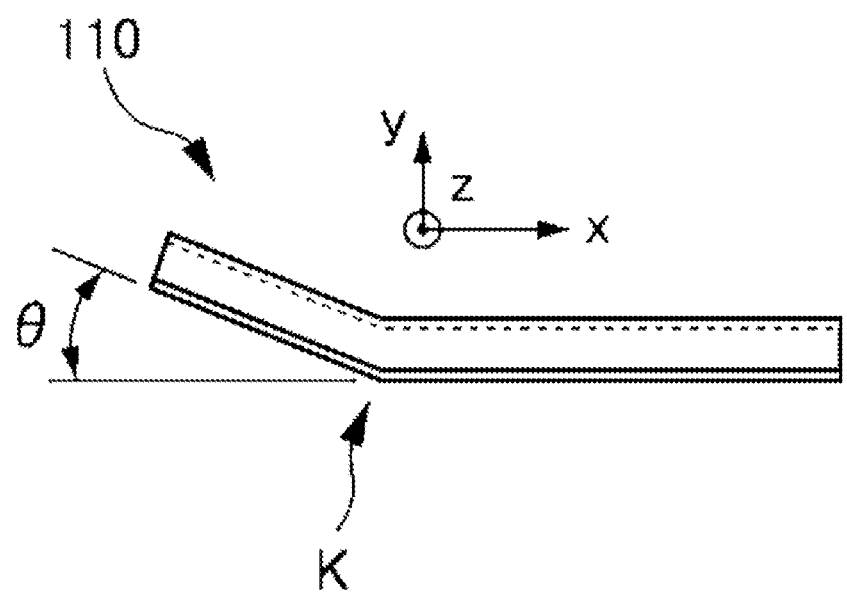
FIG. 7 is a view as viewed from the direction of an arrow E in FIG. 6.
Figure 8:
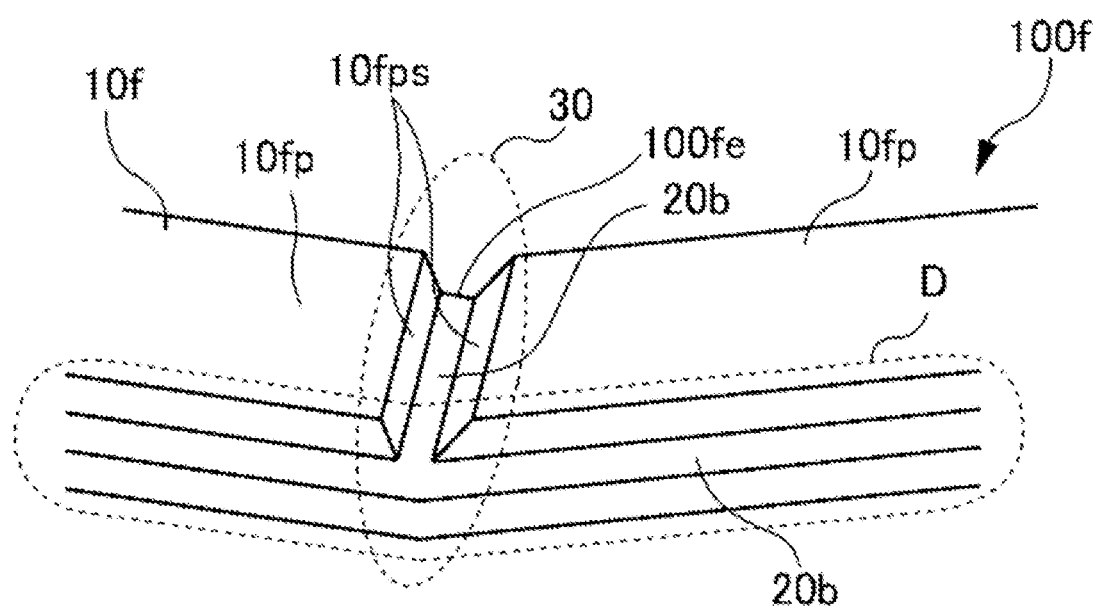
FIG. 8 is a detailed view as viewed from the direction of an arrow F in FIG. 6.
Figure 9:
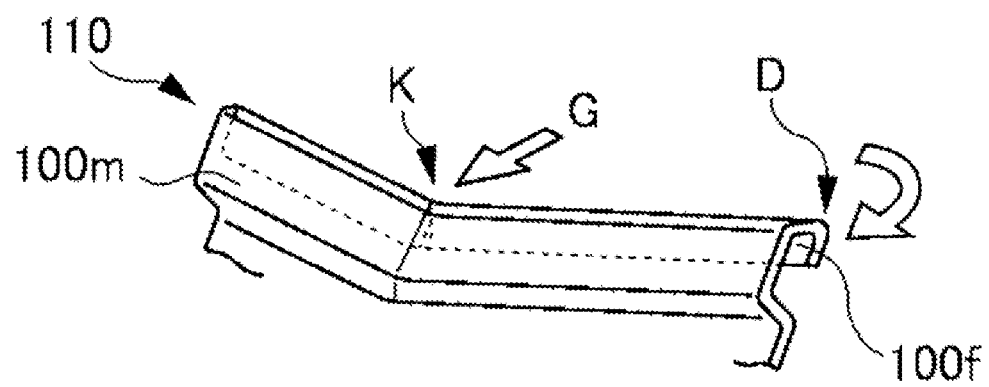
FIG. 9 is a perspective view of the waist part after the flange is folded, according to the second embodiment.
Figure 10:
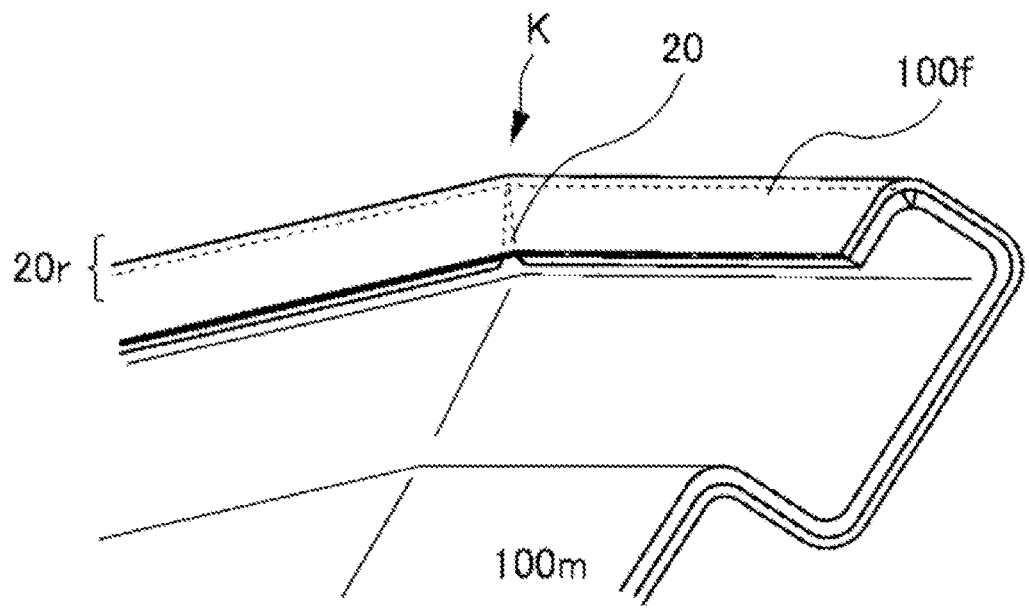
FIG. 10 is a detailed view as viewed from the direction of an arrow G in FIG. 9.

FIG. 6 is a perspective view of the waist part 110 of the door trim 100 before the flange 100f is folded, as viewed from the vehicle compartment side toward the vehicle exterior side. FIG. 7 is a view as viewed from the direction of an arrow E in FIG. 6. FIG. 8 is a detailed view of the waist part 110 of the door trim 100 as viewed from the vehicle exterior side toward the vehicle compartment side in the direction of an arrow F in FIG. 6. FIG. 9 is a perspective view of the waist part 110 of the door trim 100 after the flange 100f is folded, as viewed from the vehicle compartment side toward the vehicle exterior side. FIG. 10 is a detailed view of the waist part 110 of the door trim 100 as viewed from the vehicle exterior side toward the vehicle compartment side in the direction of an arrow G in FIG. 9.

As shown in FIG. 6, the main body 100m having the fold part D before the flange 100f is folded differs from that in the first embodiment. That is, the main body 100m is bent by an angle $\theta$ as shown in FIG. 7, at a bent part K in a direction (x-y plane) crossing a direction (y-z plane) of folding the fold part D.

In this case, the main body 100m has the structure as shown in FIG. 8. That is, the flange base 10f constituting the flange 100f is divided into multiple flange base pieces 10fp at a dividing position 30 that is along the bent part K. The bent part K extends from the fold part D to an edge 100fe of the flange 100f. The adjacent flange base pieces 10fp have the back surface 20b of the skin 20 therebetween, and this back surface 20b is exposed along the dividing position 30.

In more detail, the adjacent flange base pieces 10fp have side surfaces that face each other, which are flange-base-piece side surfaces 10fps, respectively. The flange-base-piece side surfaces 10fps are separated from each other. The back surface 20b of the skin 20 between the adjacent flange base pieces 10fp is exposed along the dividing position 30 that extends from the fold part D to the edge 100fe.

Thus, in folding the flange 100f at the fold part D as shown by an arrow in FIG. 9, the skin 20 at the bent part K shown in FIG. 10 is elongated and is deformed. This structure enables shaping the door trim 100 so as to be assembled to the door panel 200, as shown in FIG. 10.

Multiple bent part K may be provided to the flange 100f. In this case, dividing positions 30 are provided corresponding to the positions of the bent parts K to obtain multiple flange base pieces 10fp. This enables easy folding of the flange 100f in assembling the door trim 100 to the door panel 200 even when the flange 100f is formed into a complicatedly bent shape or a shape with a desired curvature. Accordingly, the degree of freedom of design of the door trim 100 is increased.

The following describes a manufacturing method of the door trim 100 with reference to FIGS. 11 to 14. Note that the following manufacturing method is used not only for the door trim 100 but also for other automobile interior parts.

Figure 11:
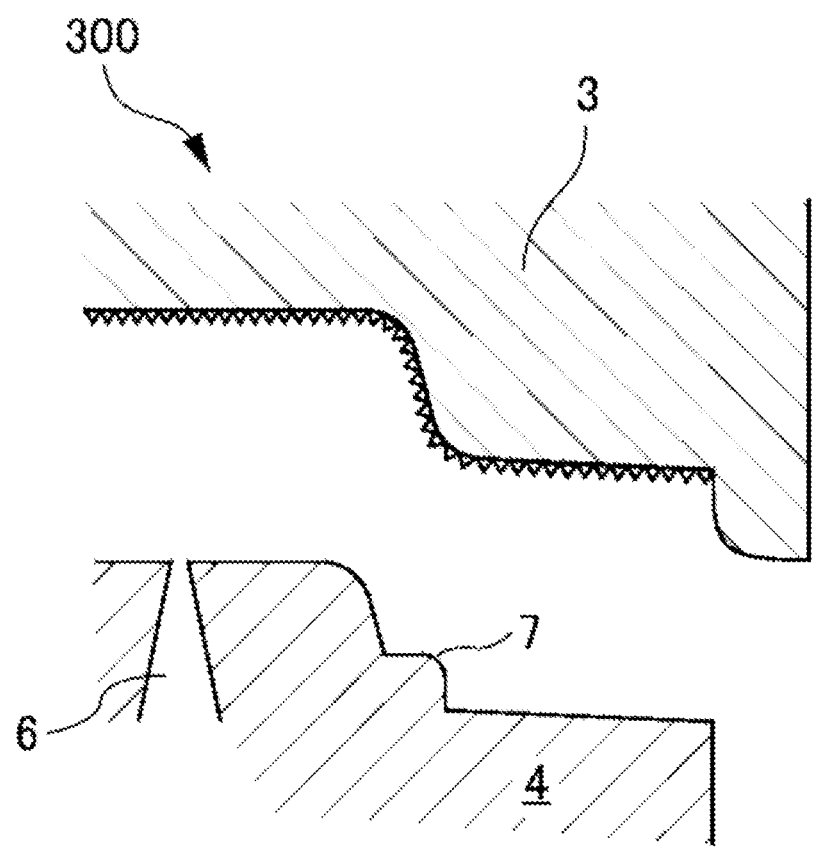
FIG. 11 is a sectional view of a principal part of a mold assembly.
Figure 12:
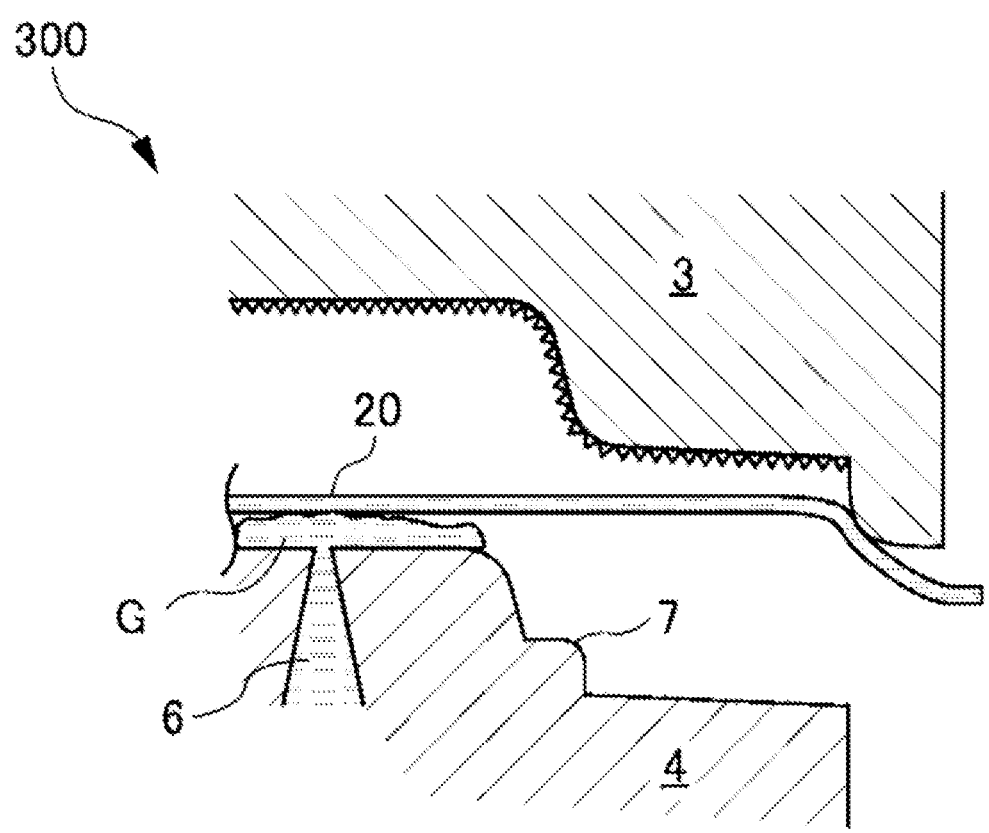
FIG. 12 is a sectional view showing a skin and melt resin for a base in the principal part.
Figure 13:
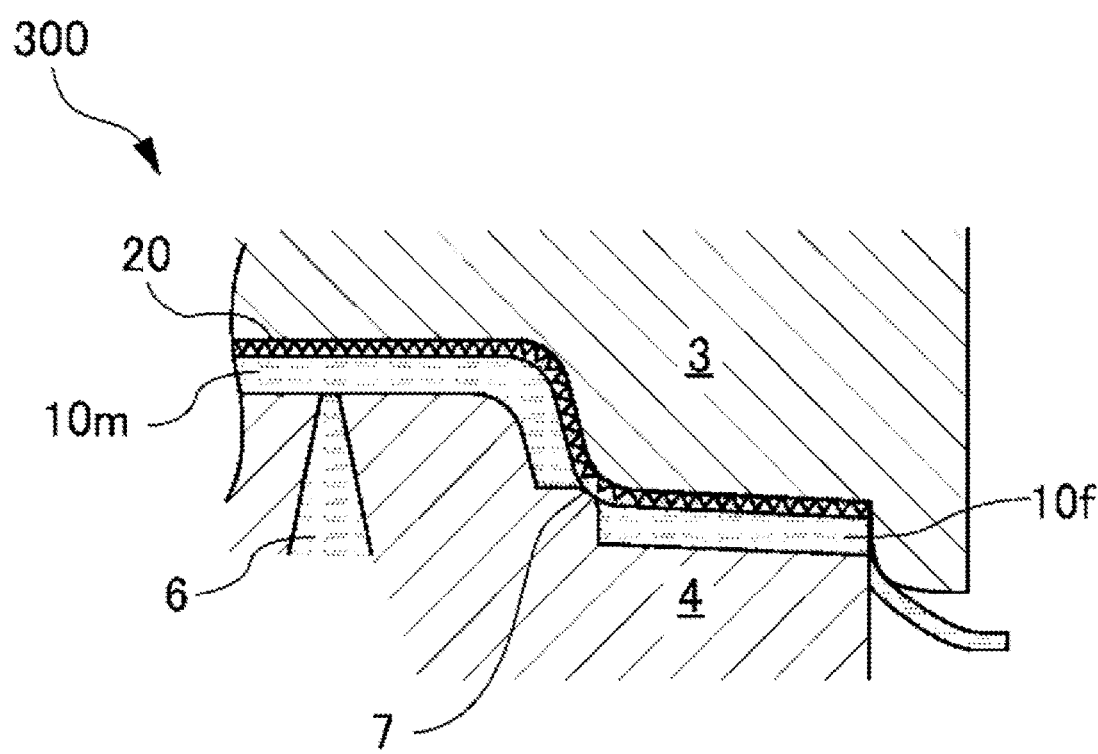
FIG. 13 is a sectional view of the principal part in insert molding.
Figure 14:
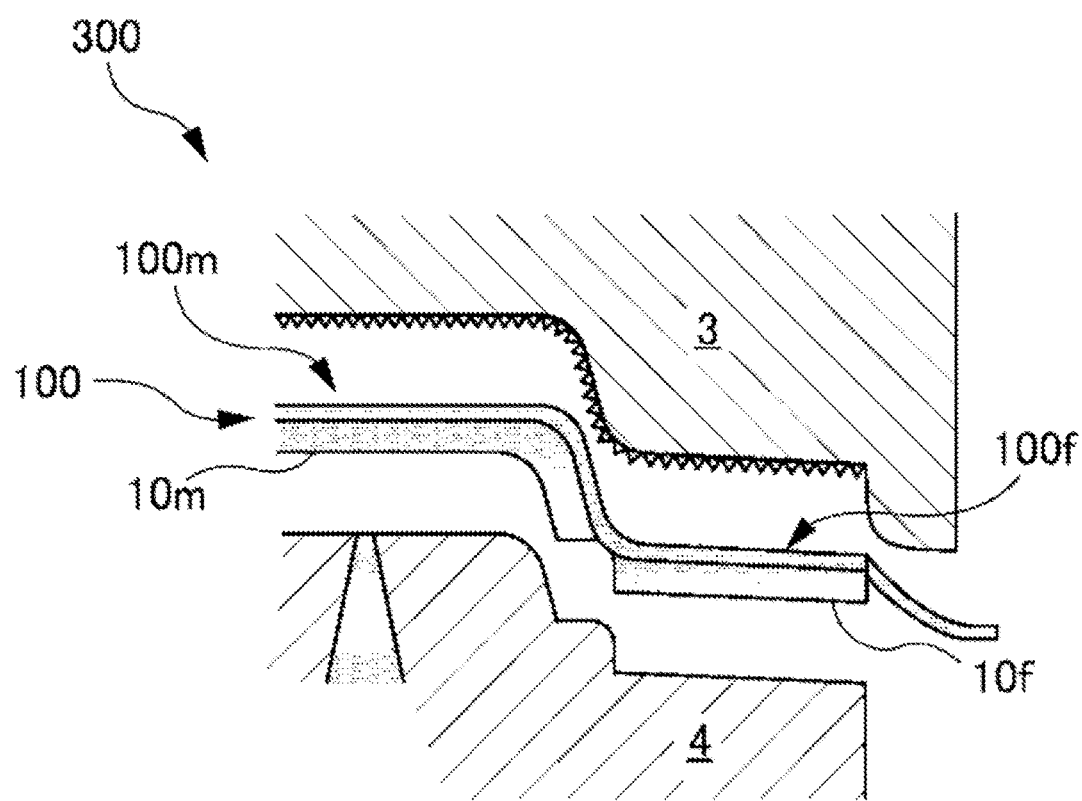
FIG. 14 is a sectional view of the principal part in removing the mold assembly.

FIG. 11 is a sectional view of a principal part of a mold assembly 300 to be used for molding the door trim 100. FIG. 12 is a sectional view showing the skin 20 and melt resin G for the base 10 in the principal part. FIG. 13 is a sectional view of the principal part in press molding. FIG. 14 is a sectional view of the principal part in removing the mold assembly 300.

As shown in FIG. 11, the door trim 100 of the automobile interior part is molded by using the mold assembly 300 that has an upper mold 3 and a lower mold 4.

In more detail, the lower mold 4 is fixedly placed on an unillustrated worktable and is provided with a supply passage 6. The supply passage 6 supplies the melt resin G for the material of the base 10. The supply passage 6 has an end that upwardly opens and has the other end that is joined to an unillustrated injection apparatus.

The lower mold 4 has a sealing projection 7 that is provided on the periphery. The sealing projection 7 contacts the back surface 20b of the skin 20 to retain the melt resin G in a clearance formed between the upper mold 3 and the lower mold 4.

The upper mold 3 is arranged above the lower mold 4 and is freely elevated by an unillustrated elevating cylinder or other device. In the condition in which the upper mold 3 is elevated down by some degree while the skin 20 is set thereto, the melt resin G for the material of the base 10 is supplied in the clearance formed between the upper mold 3 and the lower mold 4, and press molding is performed to mold the door trim 100.

The upper mold 3 has an inner surface that has a pattern for transferring the pattern to both the skin 20 of the main body 100m and the skin 20 of the flange 100f.

The door trim 100 is manufactured as follows by using the above-described mold assembly 300.

(1) First, in a condition in which the upper mold 3 and the lower mold 4 have a space therebetween, the skin 20 is disposed to the upper mold 3 (FIG. 12).

At this time, the skin 20 is retained relative to the upper mold 3 by operating an unillustrated skin set frame mechanism that is provided to the upper mold 3.

(2) Next, the melt resin G for the material of the base 10 is supplied to a clearance between the skin 20 and the lower mold 4 (FIG. 12).

(3) The upper mold 3 is elevated down by operating the unillustrated elevating cylinder (FIG. 13).

In this condition, the skin 20 and the base 10 are molded at the same time.

(4) Thereafter, in the condition shown in FIG. 13, the skin 20 and the base 10 are left for a predetermined time to be cooled after the pressing is finished, whereby unification of the skin 20 and the base 10 is promoted.

Since the inside of the upper mold 3 has a pattern at a position corresponding to the flange 100f as well as a position corresponding to the main body 100m, the pattern is transferred to the surface 20a of the skin 20 of each of the main body 100m and the flange 100f.

(5) After the predetermined time has passed, the elevating cylinder is operated to elevate up the upper mold 3 (FIG. 14), and the molded door trim 100 is removed from the mold assembly 300.

In accordance with the above procedure, the door trim 100 having the skin 20 and the base 10 that are integrally molded is obtained.

Such a manufacturing method for the door trim 100 enables transferring the pattern to the surface 20a of the flange 100f as well as the surface 20a of the main body 100m of the door trim 100.

Thus, although the flange 100f is folded, a pattern change between the main body 100m and the flange 100f is small, whereby the fold part D between the surface 20a of the main body 100m and the surface 20a of the flange 100f is unlikely to attract attention and has a good appearance.

The above describes details of examples of the preferred embodiment of the present invention. However, the automobile interior part relating to the present invention is not limited to the foregoing embodiment and can be variously modified or changed within the scope of the gist of the present invention, which is recited in each claim.

In the present invention, the automobile interior part includes the main body and the flange that is continued to the main body. The skin has the fold part that is formed between the main body and the flange. The base has the body base, which constitutes the main body, and has the flange base, which constitutes the flange and is separated from the body base at the fold part. The body base and the flange base have the back surface of the skin therebetween, and the back surface is exposed along the fold part. Thus, in assembling the automobile interior part, although the flange is folded, the fold part has only the skin and thereby has a thin thickness because the body-base side surface and the flange-base side surface do not have the base, which has a high modulus of elasticity relative to the skin, therebetween. This decreases strain (tensile stress due to bending) of the surface of the skin in folding, thereby making the surface at the fold part of the skin less prone to cause whitening and have a good appearance.

In the present invention, the facing side surfaces of the body base and the flange base are separated from each other in the condition in which the fold part is bent from the back surface side toward the surface side of the skin. Thus, although the flange is folded, strain of the surface at the fold part of the skin is decreased because the body-base side surface and the flange-base side surface do not have the base, which has a high modulus of elasticity relative to the skin, therebetween. This makes the surface at the fold part of the skin less prone to cause whitening and have a good appearance.

In the present invention, the facing side surfaces of the body base and the flange base partially contact with each other in the condition in which the fold part is folded from the surface side toward the back surface side of the skin. Thus, further folding is prevented. This facilitates determining the shape of the automobile interior part and prevents generation of excessive strain at the fold part of the skin, thereby making the fold part of the skin less prone to cause whitening and have a good appearance.

In the present invention, the main body having the fold part is bent in the direction crossing the direction of folding the fold part. The flange base that constitutes the flange is divided into the multiple flange base pieces at the dividing position. The dividing position extends from the fold part to the edge of the flange. The back surface of the skin between the adjacent flange base pieces is exposed along the dividing position. This structure prevents generation of excessive strain at the fold part of the skin in folding the flange because the skin is elongated and is deformed at the bent part, which is relatively unlikely to attract attention. Thus, although the main body is bent, the automobile interior part is shaped so as to be assembled to the door panel, and the fold part is less prone to cause whitening and has a good appearance.

In the present invention, the surface of the skin constituting the flange has a pattern. Thus, compared with a door trim having a decorative part, such as a pattern, only at the main body, a pattern change between the main body and the flange is reduced, whereby the fold part between the main body and the flange is unlikely to attract attention and has a good appearance.

REFERENCE SIGNS LIST

3 upper mold
4 lower mold
6 supply passage
7 sealing projection
10 base
10a surface
10b back surface
10f flange base
10fp flange base piece
10fps flange-base-piece side surface
10fs flange-base side surface
10m body base
10ms body-base side surface
20 skin
20a surface
20b back surface
30 dividing position
100 door trim (automobile interior part)
100f flange
100fe edge
100m main body
110 waist part
120 armrest
200 door panel
300 mold assembly
D fold part
G melt resin
K bent part
θ angle

The invention claimed is:
1. An automobile interior part, comprising:
a base having a surface and a back surface;
a skin having a back surface integrally laminated on the surface of the base;
a main body; and
a flange that is connected to the main body;
wherein the skin has a fold part formed between the main body and the flange,
the base has a body base that constitutes the main body, and a flange base that constitutes the flange and that is separated from the body base at the fold part,
the skin has a back surface that is exposed along the fold part between the body base and the flange base,
the body base and the flange base respectively have side surfaces that face each other, and the side surfaces are separated from each other in a condition in which the fold part is bent from the back surface side toward the surface side of the skin,
the main body having the fold part is bent in a direction crossing a direction of folding the fold part,
the flange base constituting the flange is divided into multiple flange base pieces at a dividing position that extends from the fold part to an edge of the flange, and
the back surface of the skin is exposed along the dividing position between the flange base pieces that are adjacent to each other.

2. The automobile interior part according to claim 1, wherein the side surfaces of the body base and the flange base, which face each other, partially contact with each other in a condition in which the fold part is folded from the surface side toward the back surface side of the skin.

3. The automobile interior part according to claim 1, wherein the surface of the skin constituting the flange has a pattern.

4. An automobile interior part, comprising:
   a base having a surface and a back surface;
   a skin having a back surface integrally laminated on the surface of the base;
   a main body; and
   a flange that is connected to the main body;
   wherein the skin has a fold part formed between the main body and the flange,
   the base has a body base that constitutes the main body, and a flange base that constitutes the flange and that is separated from the body base at the fold part,
   the skin has a back surface that is exposed along the fold part between the body base and the flange base,
   the body base and the flange base respectively have side surfaces that face each other, and the side surfaces are separated from each other in a condition in which the fold part is bent from the back surface side toward the surface side of the skin, and
   the surface of the skin constituting the flange has a pattern.

* * * * *